United States Patent [19]

Keller et al.

[11] Patent Number: 5,778,644
[45] Date of Patent: Jul. 14, 1998

[54] CROP HARVESTING PLATFORM HAVING A REVERSIBLE DRIVE FOR THE REEL, CUTTERBAR CENTER-FEED AUGERS AND CONDITIONER ROLLS

[75] Inventors: Melvin William Keller; David Henry Diebold, both of Ottumwa; Steven Lawrence Schmid, Agency; Stanley Paul Wellman, Ottumwa; Frederick Carl Krambeck, Ottumwa; Thomas Daryl Bebernes, Ottumwa, all of Iowa

[73] Assignee: Deere & Company, Moline, Ill.

[21] Appl. No.: 695,360

[22] Filed: Aug. 9, 1996

[51] Int. Cl.$^6$ ............................................. A01D 69/06
[52] U.S. Cl. ........................... 56/11.2; 56/11.3; 56/14.4;
  56/14.6; 56/16.4 C; 56/DIG. 1; 56/DIG. 3;
  56/DIG. 5; 56/DIG. 21
[58] Field of Search ............................ 56/6, 14.3, 14.4,
  56/14.5, 14.6, 11.2, 11.3, 192, 193, 153,
  DIG. 1, DIG. 5, DIG. 21, 16.4 A, 16.4 B,
  16.4 C

[56] References Cited

U.S. PATENT DOCUMENTS 4,138,837  2/1979  Love ................................. 56/11.2
4,467,590  8/1984  Musser et al. ..................... 56/11.2
5,462,486  10/1995  Norton ............................ 56/11.2 X Primary Examiner—Michael J. Carone
Assistant Examiner—Christopher J. Novosad

[57] ABSTRACT

A self-propelled windrower is provided with a platform including a reel which sweeps crop to be cut over a sickle cutterbar and into the nip of a pair of counter-rotating center-feed augers that, in turn, deliver the crop to the nip of a pair of counter-rotating conditioner rolls; and these driven components may be reversed to disgorge slugs of crop. The reversible drive includes a hydraulic pump carried by the traction unit and coupled to a motor carried by the platform. The hydraulic motor on the platform is coupled to power a main gear box which distributes power to the driven components of the platform. Operation of the pump is electrohydraulically controlled with a single switch being operable to effect forward operation of the platform drive train, and with a second switch being designed to be moved and held in place to effect and maintain the drive train in reverse. Both switches cannot be operated at the same time, however the machine can be reversed with the platform lowered, fully raised, or anywhere in between.

14 Claims, 6 Drawing Sheets

5,778,644

CROP HARVESTING PLATFORM HAVING A REVERSIBLE DRIVE FOR THE REEL, CUTTERBAR CENTER-FEED AUGERS AND CONDITIONER ROLLS

BACKGROUND OF THE INVENTION

Crop harvesting implements such as windrowers and pull-type mower-conditioners, for example, may use a sickle-type cutterbar to sever the crop from the ground. This crop is conveyed over the cutterbar and up the platform deck by a reel, moved to the center portion of the platform by a single or a double centering auger arrangement, then through conditioning rolls to be crimped to facilitate crop drying, with the crop leaving the rolls and engaging forming shields so that the crop forms a windrow or swath on the ground. If the flow of material in the platform is stopped by lack of machine capacity or a foreign object, a plug or wrap will occur. When this happens, the machine must be stopped and the plug or wrap removed. In most cases, this is accomplished by hand with a knife or other cutting device along with reversing the platform manually. This can be very time consuming.

It is known on combines to provide a reverse drive mechanism including an additional hydraulic or electrical motor in the platform and/or feederhouse drive which may be selectively driven to back plugs out of the feederhouse and onto the platform. U.S. Pat. No. 4,467,590 granted to Musser et al. on 28 Aug. 1984 discloses such a reversing mechanism. On forage harvesters, a gear case, which may be shifted into a reverse drive mode, is used on the feedrolls to convey material to the cutterhead. If the cutterhead or feedrolls plug, the gear case is shifted to its reverse drive mode to cause reverse rotation of the feedrolls so as to back out slugs.

While windrowers are known which utilize hydraulic pump and motor units for powering drives for various components of the platform and it would seem that the units could easily be reversed to clear plugs, a closer look at the drives, e.g., chain-sprocket sets and belt-pulley sets, reveals idler usage which does not lend to transferring power in reverse. Normally, only a place to couple a large bar for turning drive shafts or components in reverse by hand is provided and, in the case of the reel, belt tension is released and the reel turned backward by hand. In other machines, such as mower-conditioners, it is known to automatically cause the upper conditioning roll to be raised relative to the lower roll to permit slugs to be fed rearwardly between the rolls but no provision is made for clearing slugs in any area besides that of the conditioner rolls.

SUMMARY OF THE INVENTION

According to the present invention there is provided an improved drive for the various driven components of a platform of a crop harvesting implement.

An object of the invention is to provide a drive system for a platform wherein all of the drive components may be driven in reverse, in order to clear slugs of crop, without damage to any of the drive components.

A more specific object of the invention is to provide a platform drive system including a reversible hydrostatic drive motor coupled through a gear train for driving upper and lower conditioner rolls, respectively, with at least one of the conditioner rolls being coupled by a chain drive for at least one center-feed auger having oppositely projecting support stub shafts carrying a toothed belt sprocket coupled for driving and timing a sicklebar knife drive and with one auger support stub shaft carrying a belt pulley coupled for driving a reel jackshaft carrying a chain sprocket coupled for driving the reel shaft.

Yet another object of the invention is to provide a method of unplugging a slug of crop from the platform of a crop harvesting implement equipped with a drive train coupled for driving a reel, sickle knife, at least one center-feed auger and conditioner rolls, by performing the steps of (a) stopping forward progress of the platform and (b) reversing the direction of rotation of the entire drive train to thereby reverse the rotation of all of the driven components of the platform.

Still another object of the invention is to provide a method of unplugging as set forth in the immediately preceding object and further including the step of slowing the reverse drive speed of the drive train sufficiently from a normal forward drive to an amount which results in the crop being kept under control so as to not damage the drive train nor the driven crop treating components.

These and other objects will become apparent from reading the ensuing description in conjunction with the appended drawings.

DESCRIPTION OF THE PREFERRED EMBODIMENT

Preliminarily, it is to be noted that terms such as "right" and "left" as used herein are made in accordance with the view point of a person standing behind the implement and facing in the direction of forward travel. Also, some elements are described as occurring in pairs when only one of the two is shown, it to be understood that the element not illustrated is identical to or a mirror image of the one shown.

Figure 1:
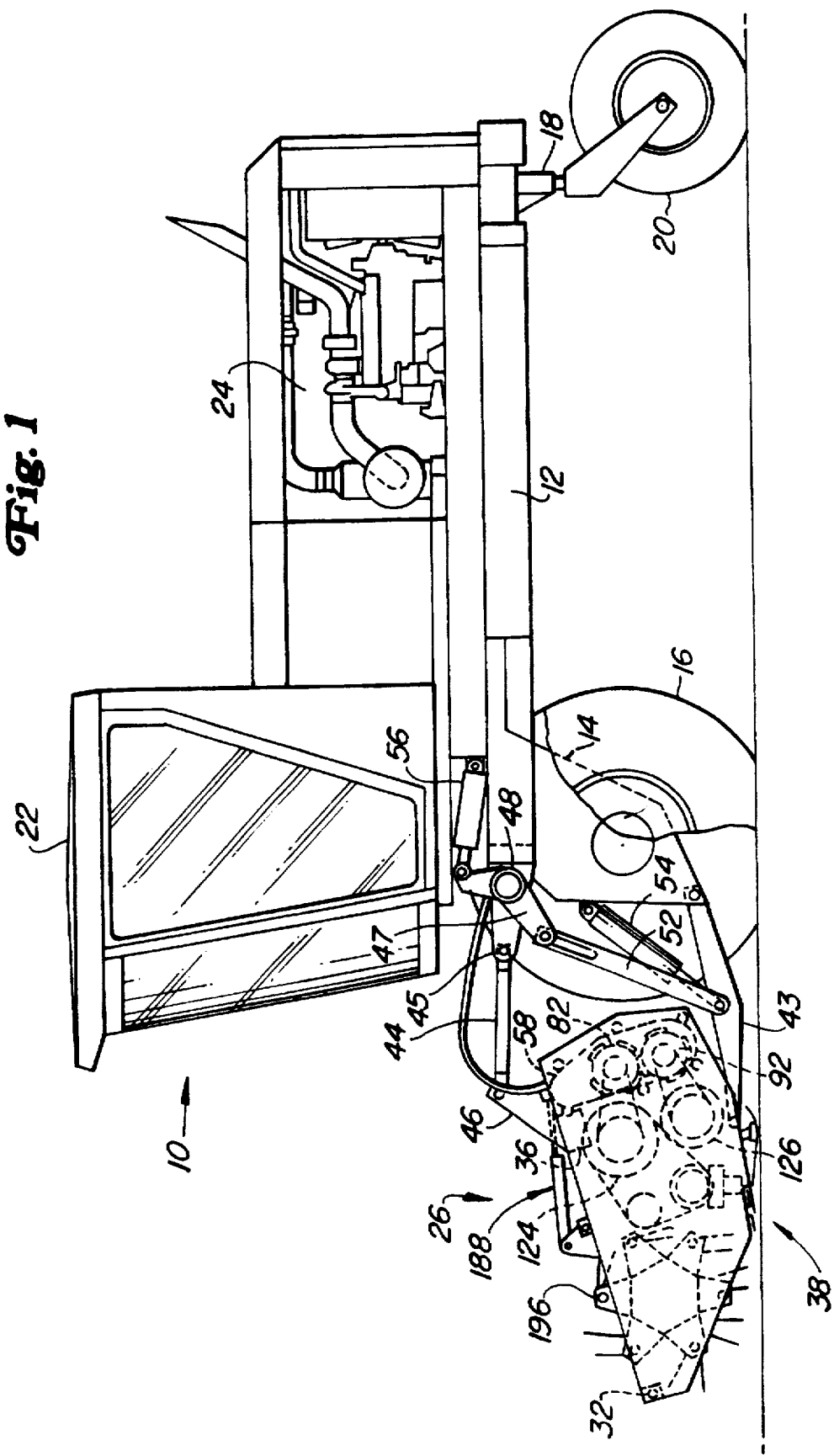
FIG. 1 is a somewhat schematic left side elevational view of a self-propelled windrower showing the drive for the sicklebar, center-feed augers and conditioner rolls.

Referring now to FIG. 1, there is shown a self-propelled windrower 10 which is an example of the type of implement with which the present invention is particularly adapted for use. Specifically, the windrower 10 includes a main frame 12 including a pair of wheel support structures 14 at its forward end respectively to which a pair of transversely spaced drive wheels 16 are mounted. An axle 18 extends transversely at a rear portion of the frame 12 and is connected thereto for swinging about a horizontal longitudinal pivot axis established by a mounting (not shown) between a mid-point of the axle with the frame 12. Respectively mounted to opposite ends of the axle 18 are a pair of caster-mounted wheels 20. An operator's cab 22 is mounted to an upper forward location of the frame 12 and contains various controls (not shown) for the windrower 10. An internal combustion engine 24 is mounted on a rear section of the frame 12 and provides the power for driving all of the traction unit components plus the driven components associated with the windrower platform.

A platform or header 26 is suspended from the frame 12 for floating vertically during cutting operation and for being moved vertically between a raised transport position and a lowered working position. Specifically, referring now also to FIGS. 2 and 3, it can be seen that the platform 26 includes outer, right- and left-hand sidewalls 28 and 30, respectively, joined at upper front locations by a knock-down bar 32, at upper rear locations by a cross beam 36 and at lower central locations by a sickle cutterbar sill assembly 38. Respectively spaced inwardly from the outer side walls 28 and 30 are inner right- and left-hand side walls 40 and 42.

The platform or header 26 is suspended from a forward end of the frame 12 by a pair of lower links 43 and a central upper link 44. Specifically, the pair of lower links 43 have rear ends respectively pivotally mounted to lower ends of the pair of wheel support structures 14 and front ends respectively pivotally mounted to the platform 26; and the upper link 44 having opposite ends respectively pivotally coupled to a main frame bracket 45 and a bracket 46 fixed to a location of the cross beam 36 approximately midway between its opposite ends. Coupled between each lower link 43 and a respective one of a pair of crank arms 47, respectively fixed to opposite ends of a rockshaft 48 rotatably mounted to the frame 12, is a lift link 50 defined by a pair of parallel straps and including a float slot 52 in its upper end. A hydraulic platform float cylinder 54 is coupled between each wheel support structure 14 and the adjacent lower link 43; and a hydraulic platform lift cylinder 56 is connected between the main frame 12 and the rockshaft 48.

Figure 4:
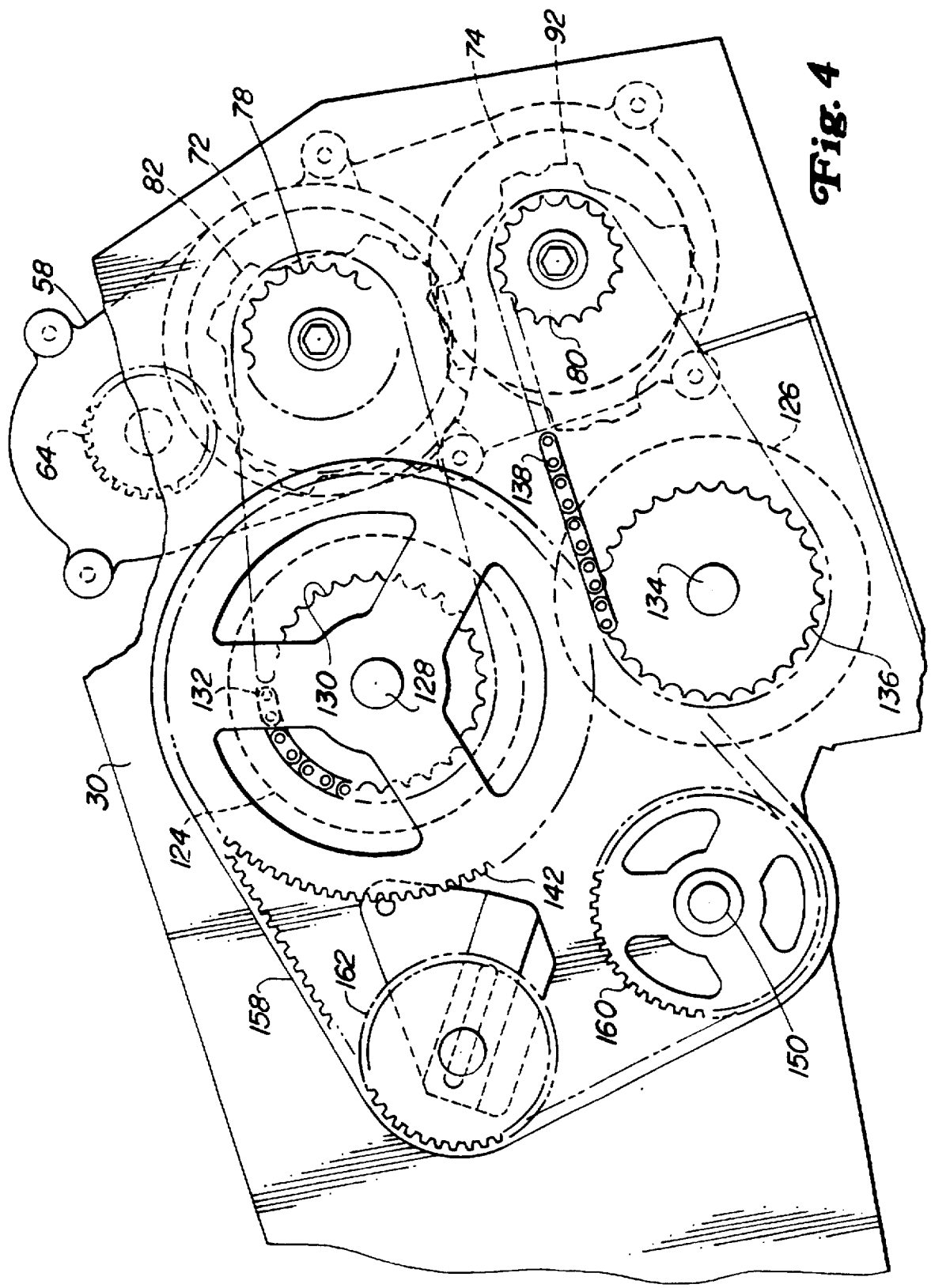
FIG. 4 is an enlarged left side elevational view, with the auger chain case covers removed and with portions of the sidewall and gear case broken away, showing that portion of the drive appearing in FIG. 1 that is involved in driving the left-hand sicklebar, center-feed augers and conditioner rolls.

Referring now also to FIG. 4, there is shown a platform drive structure including a power-distributing gear box or housing 58 bolted to an inner surface of the outer left-hand sidewall 30. The gear box 58 is vertically elongated, and bolted to an inner upper location thereof is a hydraulic motor mount casting 60 containing a horizontal gear box input shaft 62 mounted for rotation about a horizontal axis and carrying an input spur gear 64. A reversible, fixed displacement hydraulic motor 66 is mounted to an inner end of the casting 60 and has an output shaft 68 coupled to the input shaft 62. An upper drive shaft 70 extends horizontally through and is rotatably mounted in the gear box 58 and carries an upper drive gear 72 mounted in constant mesh with the input spur gear 64 and with an identical lower drive gear 74 carried by a lower drive shaft 76 that also extends horizontally through and is rotatably mounted in the gear box 58. Respectively mounted to outer ends of the drive shafts 70 and 76 are upper and lower roller chain sprockets 78 and 80.

Figure 3:
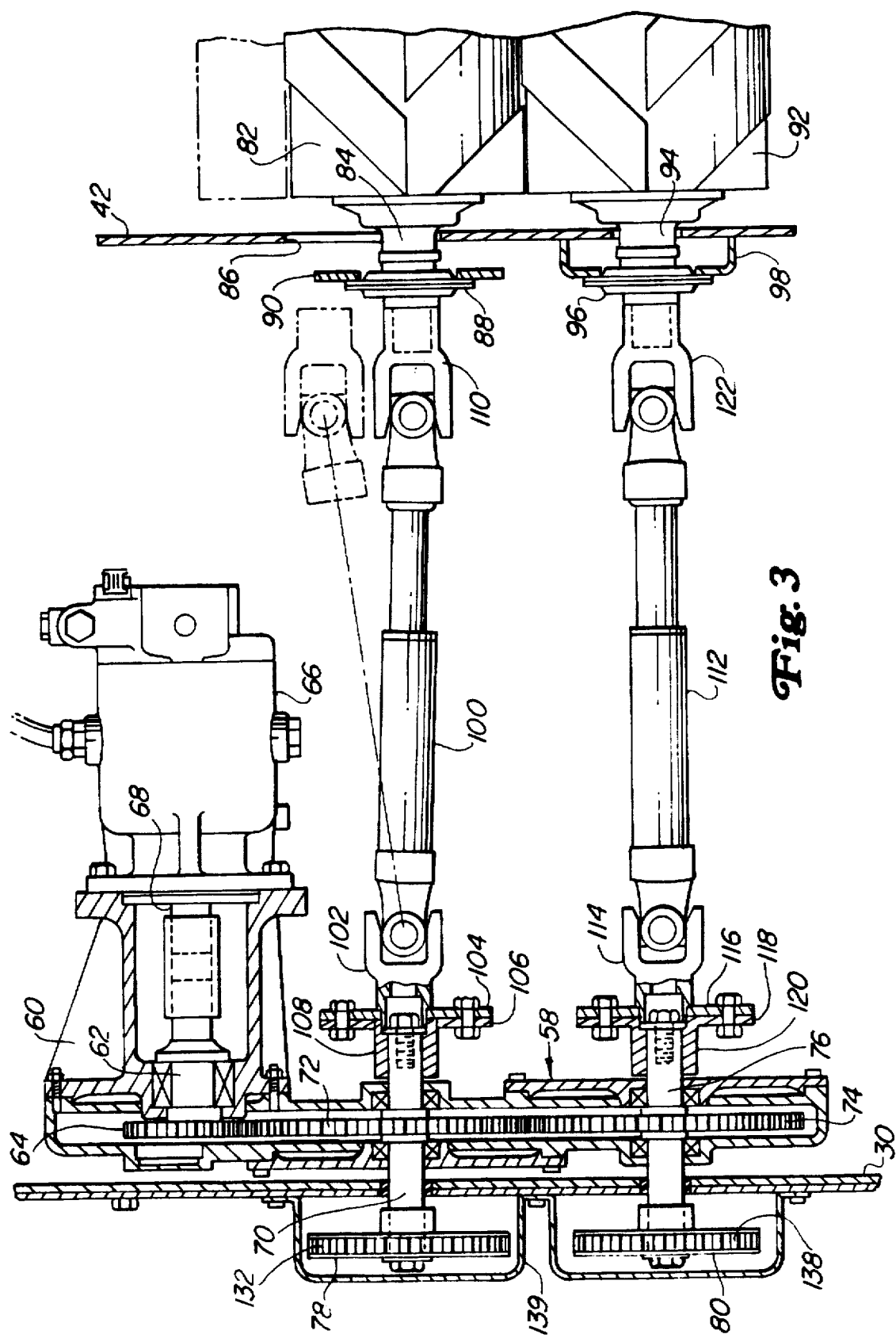
FIG. 3 is an enlarged rear elevational view with parts in section showing the hydraulic motor and power distribution gear case through which flows the power for driving all of the platform components.

As best seen in FIG. 3, located in general axial alignment with the upper drive shaft 70 is an upper conditioner roll 82 which extends between, and includes oppositely projecting, axially aligned stub shafts 84 projecting through vertically elongated openings 86 provided in, the inner sidewalls 40 and 42. Ends of the oppositely projecting conditioner roll stub shafts 84 are respectively received in a pair of support bearings 88 carried in forward ends of a pair of respective support arms 90 having their rear ends vertically pivotally mounted to the inner sidewalls 40 and 42, in a manner not shown but well known in the art, so as to permit limited vertical movement of the upper conditioner roll 82 for a purpose explained below. A lower conditioner roll 92 is located in general axial alignment with the lower drive shaft 76 and extends horizontally between, and includes opposite ends defined by stub shafts 94 respectively projecting through holes provided in the inner sidewalls 40 and 42. Ends of the stub shafts 94 are respectively received in a pair of bearings 96 carried by respective bearing supports 98 fixed to outer faces of the inner sidewalls 40 and 42.

As can best be seen in FIG. 3, an upper telescopic drive shaft assembly 100 includes a u-joint yoke 102 at its left-hand end connected to the upper drive shaft 70 by a coupling defined by an annular flange 104 welded to the u-joint yoke 102 and bolted to an annular flange 106 welded to a collar 108 keyed to a smooth tapered right-hand end of the drive shaft 70. The shaft assembly 100 also includes a u-joint yoke 110 at its right-hand end received on a splined end of the upper conditioner roll shaft 84. Similarly, a lower telescopic drive shaft assembly 112 includes a u-joint yoke 114 at its left-hand end connected to the lower drive shaft 76 by a coupling defined by an annular flange 116 welded to the u-joint yoke 114 and bolted to an annular flange 118 welded to a collar 120 keyed to a smooth tapered right-hand end of the drive shaft 76. The shaft assembly 112 also includes a u-joint yoke 122 at its right-hand end received on a splined end of the lower conditioner roll shaft 94.

As viewed in FIG. 4, the forward or normal direction of rotation of the input spur gear 64 is clockwise, with the upper conditioner roll drive gear 72 rotating counterclockwise and the lower conditioner roll drive gear 74 rotating clockwise. With the drive operating in this fashion, the upper and lower conditioner rolls 82 and 92 are counter-rotated so as to feed material rearwardly therebetween. The drive sprockets 78 and 80 are likewise counter-rotated and their respective rotations are transferred to upper and lower center-feed augers 124 and 126. The upper auger 124 includes opposite ends defined by oppositely projecting, axially aligned auger support stub shafts 128 respectively rotatably supported by the platform outer sidewalls 28 and 30. A roller chain sprocket 130 is secured to a left-hand end portion of the leftwardly projecting stub shaft 128 outboard of the sidewall 30 in fore-and-aft alignment with the sprocket 78. A roller chain 132 is trained about the sprockets 78 and 130. Likewise, the lower auger 126 includes a pair of oppositely projecting auger support stub shafts 134 respectively rotatably supported by the platform outer sidewalls 28 and 30, with a roller chain sprocket 136 being mounted on a left-hand end portion of the leftwardly projecting stub shaft 134, the sprocket 136 being in fore-and-aft alignment with the roller chain sprocket 80. A roller chain 138 is trained about the sprockets 80 and 136. Preferably, the chains 132 and 138 are each operated in lubricant contained in a fluid-tight housing 139 (FIG. 3).

Figure 2:
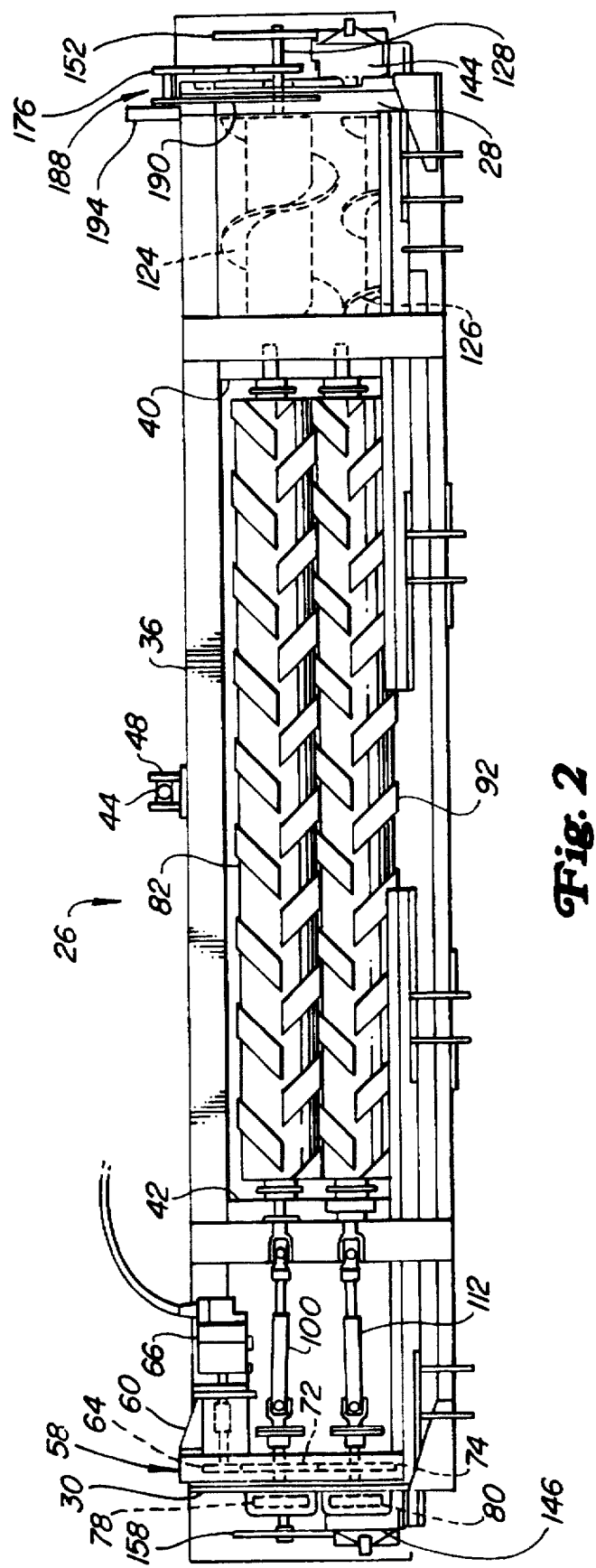
FIG. 2 is a rear elevational view of the windrower platform and drive shown in FIG. 1, with some parts being omitted for simplicity and some drive shields broken away or removed for revealing drive elements.
Figure 5:
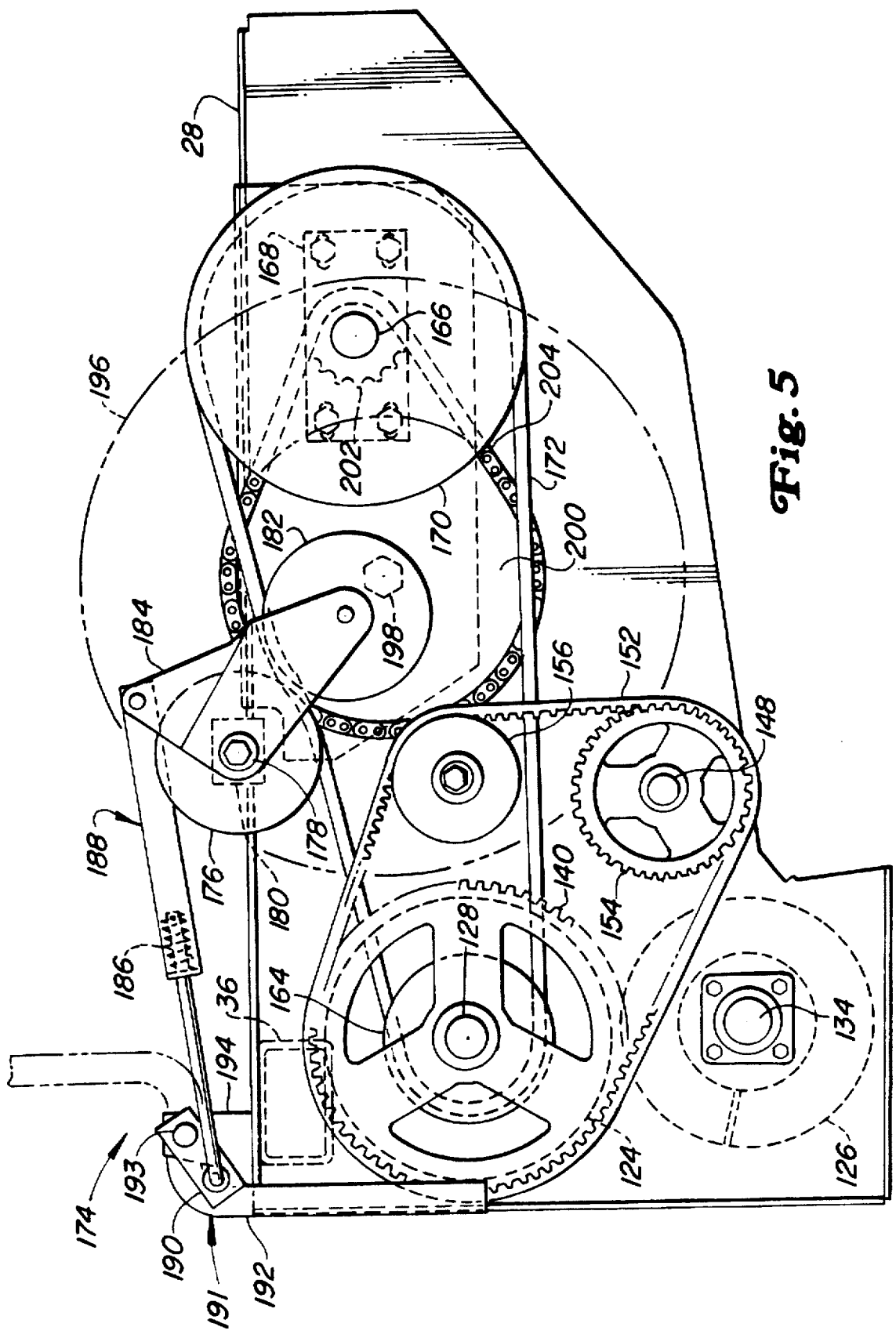
FIG. 5 is an enlarged right side elevational view showing the reel drive and the right-hand sicklebar drive.

Referring now also to FIG. 5, it can be seen that mounted to ends of the oppositely projecting upper auger support stub shafts 128 are right- and left-hand toothed-belt, sicklebar knife drive sprockets 140 and 142 (FIG. 4), respectively. The cutterbar sill assembly 38 supports a dual sicklebar including right-and left-hand sicklebar knives (not shown) reciprocably mounted, in a conventional manner such that inner ends thereof overlap in a zone between opposite sidewalls of the platform 26. The sicklebar knives are respectively driven from opposite sides of the platform 26 through right- and left-hand wobble drive arrangements respectively including right- and left-hand drive housings 144 and 146 (FIG. 2). Rotatably mounted in an upper end portion of the housings 144 and 146 are horizontal input shafts 148 (FIG. 5) and 150 (FIG. 4), respectively. Mounted on the shaft 148 in fore-and-aft alignment with and coupled for being driven from the toothed belt sprocket 140, as by a toothed belt 152, is a toothed belt sprocket 154 having a diameter approximately one-half that of the sprocket 140 to produce a desired reciprocating speed at the right-hand sicklebar. An adjustable idler pulley 156 is provided for maintaining proper tension in the belt 152. Similarly, mounted on the shaft 150 in fore-and-aft alignment with and coupled for being driven from the toothed belt sprocket 142, as by a toothed belt 158, is a toothed belt sprocket 160 having a diameter approximately one-half that of the sprocket 142 to produce a desired reciprocating speed at the left-hand sicklebar knife. An adjustable idler pulley 162 is provided for maintaining proper tension in the belt 158. The belts 152 and 158 are commonly called timing belts and operate so that the sicklebar knives are driven in a timed fashion relative to each other so that the reciprocating dynamic knife forces are counterbalanced to reduce platform vibrations.

Located on the right-hand side of the platform 26, so as to balance some of the weight of those platform drive components located only on the left-hand side of the platform, are reel drive components. Specifically, mounted inboard of the sickle drive toothed belt sprocket 140 on a right-hand end portion of the rightwardly projecting upper auger support stub shaft 128 is a reel drive belt pulley 164. A jackshaft 166 extends horizontally and is rotatably supported, in cantilever fashion, by a double roller bearing (not shown) mounted in a bracket 168 mounted to the outer platform sidewall 28 for fore-and-aft adjustment at a location adjacent a forward end of the platform 26. A belt pulley 170 is mounted on the jackshaft 166 in fore-and-aft alignment with the belt pulley 164 and is coupled to the latter by a reel drive belt 172. An adjustable belt tensioning device 174 is provided for keeping proper tension in the belt 172. The device 174 includes a fixed idler pulley 176 that is mounted for rotating about a shaft 178 carried by a support block 180 secured to the sidewall 28. A lower portion of the idler pulley 176 is engaged with a top surface of an upper run of the belt 172 at a location approximately half-way between the belt pulleys 164 and 170. A second idler pulley 182 is mounted to one end of a triangular shaped bell crank 184 that is mounted for swinging vertically about the shaft 178, the pulley 182 being disposed for engaging a lower surface of the upper run of the belt 172 at a location adjacent to that engaged by the fixed idler pulley 176. The movable idler pulley 182 is biased against the belt 172 by the action of a coil compression spring 186 forming part of a spring capsule assembly 188 connected between the bell crank 184 and an end of a crank arm 190 of an over-center lever assembly 191 including a handle 192, the arm 190 and handle 192 being fixed to a pin 193 that is pivotally mounted to an upstanding bracket 194 welded to the rear cross beam 36. The handle 192 is swingable between a downward tension-applying position, as shown in solid lines, wherein it loads the spring 186, and a tension-releasing position, as shown in broken lines, wherein it acts to release the energy stored in the spring 186.

A reel 196 includes a pair of oppositely projecting stub shafts 198 respectively supported by the sidewalls 28 and 30 such that the an axis defined by the stub shafts 198 is located approximately on a line of centers extending through the upper auger support shaft 128 and the jackshaft 166 at a location that is approximately transversely aligned with the idler pulley 182. A reel drive chain sprocket 200 is mounted on the right-hand stub shaft 198 in fore-and-aft alignment with a reel drive chain sprocket 202 mounted on the jackshaft 166 and is coupled to be driven from the sprocket 202 by a reel drive chain 204. The diameter of the sprocket 202 is much smaller than the diameter of the sprocket 200 so as to effect a considerable speed reduction between the jackshaft 166 and reel stub shafts 198. Different reel speeds are achievable by changing the size of the smaller sprocket 202. The adjustable mount for the jackshaft 166 permits the drive chain 204 to be properly tensioned.

It is important to note that the platform drive system described above is designed to be driven in the reverse direction without causing damage to any of the drive components. Specifically, the constant mesh gearing contained within the power distribution gear box 58 can be reversed without causing damage to any of the gears or to the conditioner rolls 82 and 92. Also, because of their relatively short length and accurate placement of their support shafts, no idler sprockets are required to be used with the roller chains 132 and 138 in order to keep the chains properly tensioned. Therefore, changing the direction of rotation of the input gearing merely results in a change of the slack and tensioned runs of the chains 132 and 138 without causing any harm to the chains or the sprockets about which they are trained. Further, it is noted that a significant characteristic of the timing belts 152 and 158 is that they undergo little or no elongation during operation. Thus, operation of the timing belts 152 and 158 in reverse does not have any adverse affect on the belts nor on the sicklebar knives forming part of the cutterbar sill assembly 38. In normal operation, the reel drive jackshaft 166 is driven clockwise, as viewed in FIG. 5, with the upper run of the drive belt 172 being the slack run of the belt and with the fixed idler pulley 176 and the spring-loaded idler pulley 182 taking up this slack. While reversal of the direction of rotation of the jackshaft 166 results in the lower run of the belt becoming the slack run, the spring capsule assembly 188 acts as a stop to limit the movement of the idler pulley 182, the idler pulley 182 thus working in conjunction with the fixed idler pulley 176 to insure that proper torque is transmitted for rotating the reel in reverse. Thus, the entire platform drive is reversible to effectively discharge slugs of crop without causing any damage to the drive components.

Figure 6:
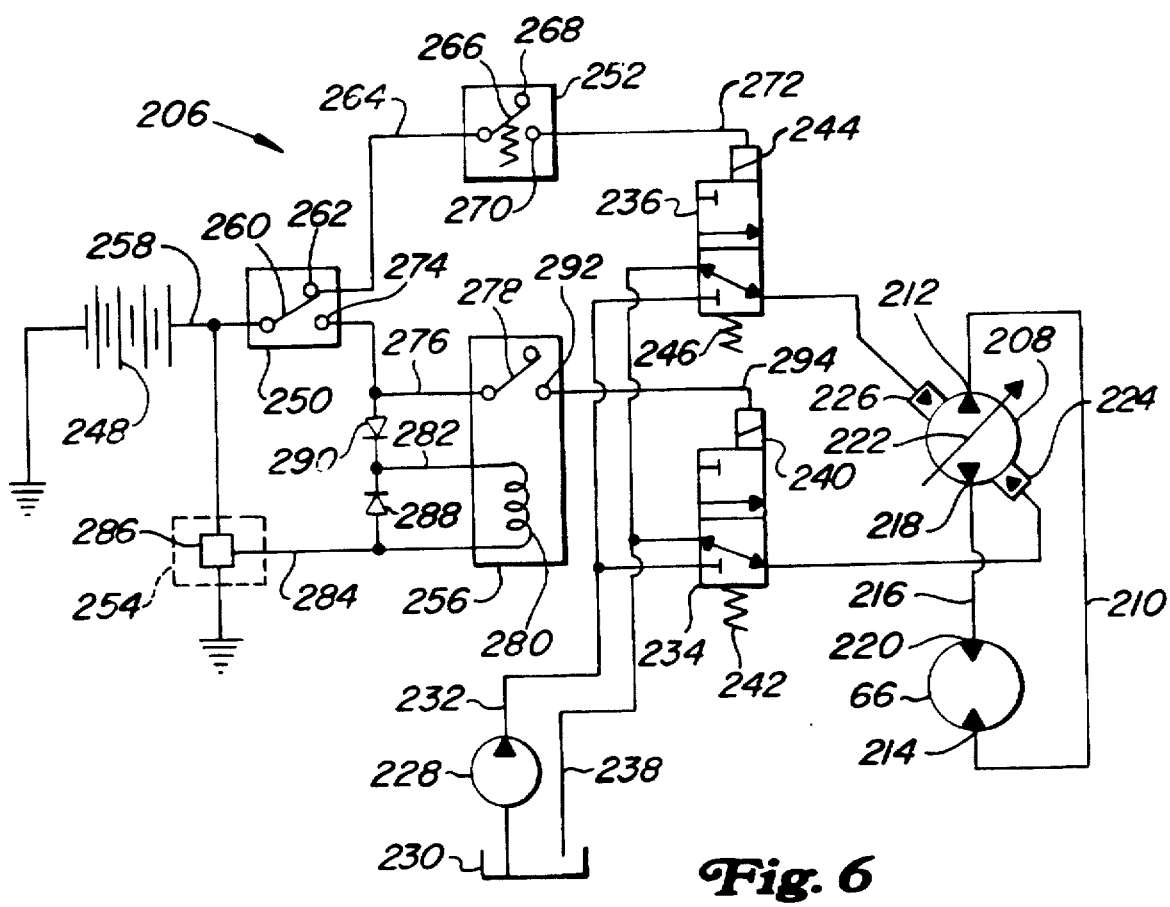
FIG. 6 is a schematic view showing the electro-hydraulic circuit for controlling forward and reverse operation of the hydraulic drive motor used for driving all of the components of the platform.

Referring now to FIG. 6, there is shown an electro-hydraulic drive control circuit 206 for permitting remote control of the platform drive. Specifically, the drive control circuit 206 includes a hydrostatic drive including a variable displacement pump 208 coupled in a closed loop circuit with the fixed displacement motor 66 by a first pressure/return conduit 210 coupled between a forward work port 212 of the pump and a first work port 214 of the motor, and a second pressure/return conduit 216 coupled between a reverse work port 218 of the pump and a second work port 220 of the motor. The pump 208 includes a swashplate 222 movable from a neutral position by forward and reverse stroking cylinders 224 and 226, respectively. Control fluid for effecting operation of the cylinders 224 and 226 is supplied by a charge pump 228 having an inlet port coupled to a sump 230 and an outlet port coupled, as by a branched supply line 232, to solenoid-controlled, two-position "forward" and "reverse" control valves 234 and 236, these valves being coupled to the sump 230 by a branched return line 238. In a manner not shown but well known in the art, relief valves would be connected between the pressure/return lines 210 and 216; and a source of charge pressure would also be coupled to the lines 210 and 216 to make up fluid losses due to leakage.

As viewed in FIG. 6, an upper end of the valve 234 is provided with a "forward" solenoid 240 which, when energized, shifts the valve 234 downwardly, against the bias of a return spring 242, so as to route control fluid to the "forward" control cylinder 224 which acts to move the swashplate 222 to cause the pump 208 to supply pressure fluid to the pressure/return line 210. Similarly, the upper end of the valve 236 is provided with a "reverse" solenoid 244 which, when energized, shifts the valve 236 downwardly against the bias of a return spring 246, so as to route control fluid to the "reverse" cylinder 226 which acts to move the swashplate 222 to cause the pump 208 to supply pressure fluid to the pressure-return line 216. It is here noted that a stop (not shown) is provided for limiting the stroke of the cylinder 226 such that the resulting flow of pressure fluid from the pump to the pressure-return line 216 will cause the motor 66 to be driven at about 25% of the forward drive speed of the motor. This slower reverse speed is desired in order to back out crop under control to avoid damaging platform driven elements or components.

The control of electrical current to the solenoids 240 and 244, respectively of the "forward" and "reverse" control valves 234 and 236, from a source of electrical power, here shown as a battery 248 is effected by normally "open", manually-operated platform drive "forward" and "reverse" control switches 250 and 252, respectively, together with an operator presence sensing circuit represented by functional box 254 and including a "forward" relay switch 256 forming part of a latching relay. Specifically, a power lead 258 connects the battery 248 to a switch element 260 of the "forward" control switch 250, the switch element 260 normally being in contact with an "interlock" contact 262 connected, as by an interlock lead 264, to a switch element 266 of the "reverse" control switch 252, which is normally biased into engagement with an "open" contact 268. The switch element 266 may be manually switched and held in engagement with a "reverse" contact 270 connected, as by a "reverse" lead 272, to the solenoid 244 of the "reverse" control valve 236. Release of the element 266 results in it returning to its "open" position. Thus, it is apparent that the interlock lead 264 functions to provide power for actuating the solenoid 244 for shifting the control valve 236 to its "reverse" position only when the "forward" control switch 250 is in its "open" position. The "forward" control switch 250 includes a "forward" contact 274 connected, as by a lead 276, to a normally open switch element 278 of the "forward" relay switch 256. The switch 256 includes a coil 280 having one end coupled, as by a lead 282 to a branch of the lead 276 and having a second end connected, as by a lead 284, to a normally open, electronically controlled ground switch 286 forming part of the operator presence sensing circuit 254 and being operable to establish a ground connection only when the operator is in a proper position for operating the vehicle 10 and the switch element 260 of the "forward" control switch 250 is in engagement with the "forward" contact 274. Circuit protection diodes 288 and 290 are provided for respectively preventing current flow from the lead 276 to the lead 284 and vice-versa. Preferably, the ground switch 286 embodies an electronic switching device such as a transistor connected in circuit with a capacitor that acts as a time-delay device so that the transistor is not turned "off" by momentary absence of an operator from a proper operating position. In the absence of the operator position sensing circuitry, as might be desired, the latching relay would be omitted with the "forward" contact 274 being coupled directly to the "forward" solenoid 240.

Energization of the coil 280 results in the relay switch element 278 being moved into engagement with a "forward" contact 292 which is connected, as by a "forward" lead 294, to the solenoid 240 of the "forward" control valve 234.

Assuming an operator to be properly seated for operating the windrower 10 and that it is desired to cut a swath of crop, the header or platform 26 will be lowered at the desired location in a field. The switch element 260 will be moved to its "forward" location in engagement with the contact 274. This will result in the coil 280 being energized which causes the element 278 of the relay switch being moved into engagement with the contact 292. The element 278 will be latched in this position until such time that the circuit through the coil 280 is broken by either the operator moving the switch element 260 into engagement with the contact 262 or by becoming improperly seated thus triggering opening of the operator position sensor switch 286 and hence the opening of the ground circuit for the coil 280. In any event, latching of the element 278 into engagement with the contact 292 completes an electrical circuit to the solenoid 240 of the "forward" control valve 234 causing the latter to be shifted downwardly, thus, connecting the charge pump 228 to the "forward" control cylinder 224 resulting in the swash plate 222 being moved in a first direction from a "neutral" position for effecting the delivery of pressure fluid to conduit 210 and the forward driving of the motor 66. This results in the reel 196 being rotated and in the upper and lower conditioner rolls 82 and 92, respectively, and the upper and lower center-feed augers 124 and 126, respectively, being counter-rotated to feed crop rearwardly through the windrower 10. The sicklebar knives would also be driven by way of the drive including the belts 152 and 158.

In the event that a slug of crop is fed into the windrower 10 which causes a plug condition, the operator will stop forward movement of the windrower 10 and may, but not necessarily, raise the platform 26 from its lowered, working position. Next the operator will move the switch element 260 of the "forward" switch 250 into contact with the switch element 262. This will de-energize the relay coil 280 resulting in the switch element 278 moving to its "open" position so as to de-energize the solenoid of the "forward" control valve 234. The spring 242 will then act to return the valve 234 to its "dump" position connecting the pump cylinder 224 to the sump 230 so as to neutralize the swashplate of the pump 208 resulting in no fluid being supplied by the pump. The operator will then actuate the "reverse" control switch 252 by moving, and then holding, the normally open switch element 266 to its "closed" position wherein it engages the contact 270. This completes a circuit to the solenoid 244 of the "reverse" control valve 236 which remains completed only so long as the operator holds the switch element 266 in its "closed" position. Completion of the circuit results in the "reverse" valve 236 shifting downwardly so as to connect the pump 228 to the "reverse" control cylinder 226 resulting in the swashplate 222 being moved in a second direction from its "neutral" position so that the pump 208 operates to deliver pressure fluid to the pressure/return line 216. The motor 66 is then driven in the reverse direction so as to reverse the direction of operation of the reel 196, cutterbar knife drives, augers 124 and 126, and conditioner rolls 82 and 92. Due to the presence of a stop, the stroke of the "reverse" control cylinder 226 will be limited so that the speed of operation of the motor 66 is only about 25% of its normal forward drive speed. Reverse operation of the aforementioned driven components of the platform 26 will cause the slug of crop to be disgorged from the windrower. It is noted that the sicklebar knives will also be driven in the reverse direction, which in some conditions will aid in the disgorgement of a crop slug.

Figure 7:
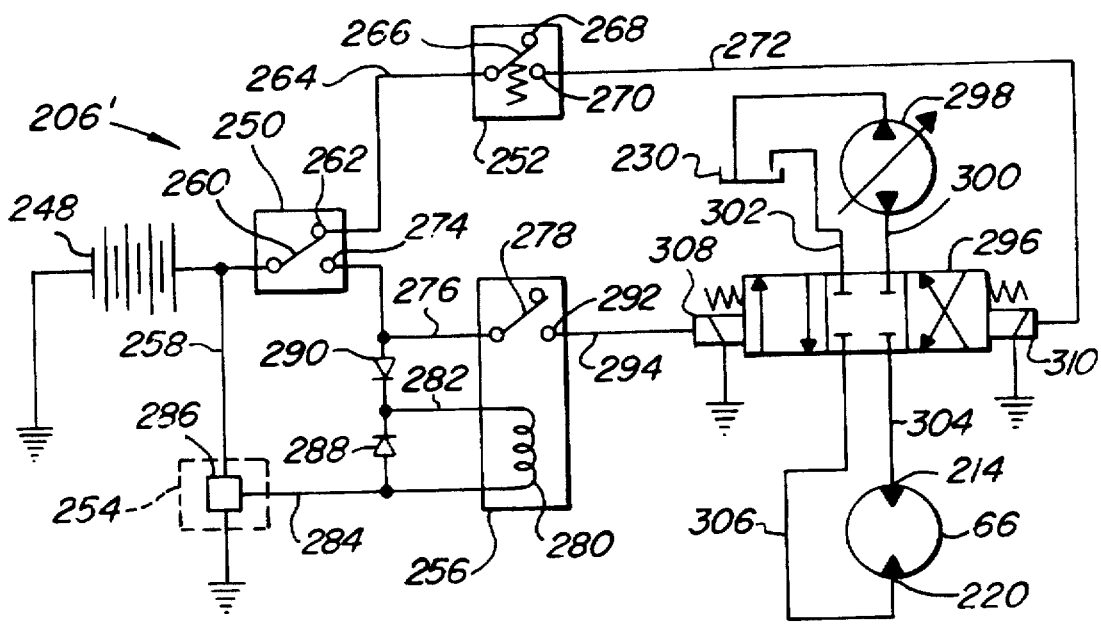
FIG. 7 is a schematic view showing an alternate electro-hydraulic circuit for controlling forward and reverse operation of the hydraulic drive motor used for driving all of the components of the platform.

Referring now to FIG. 7, there is shown an alternate to the hydraulic portion of the electro-hydraulic control circuit 206, with like components being given like reference numerals. Specifically, there is shown an electro-hydraulic control circuit 206' wherein a three-position, spring-centered, solenoid-operated direction control valve 296 is coupled to an output of a variable displacement pump 298 by a supply line 300, to the sump 230 by a return line 302, to the work port 214 of the motor 66 by a pressure/return line 304 and to the work port 220 of the of motor by a pressure/return line 306. The direction control valve 296 includes a "forward" solenoid 308 coupled to the "forward" lead 294 and a "reverse" solenoid 310 coupled to the "reverse" lead 272. It is to be understood that a conventional pressure relief valve would be located between the lines 300 and 302.

Operation of the electro-hydraulic control circuit 206' is similar to that of the above-described operation of the control circuit 206. However, instead of the swashplate of the pump 298 being controlled to reverse the flow through the pump, and hence the direction of operation of the motor 66, the valve 296 is shifted to opposite sides of its centered, "neutral" position to effect a reversal of flow through the motor 66 so as to change the drive direction of the motor 66. Thus, energization of the "forward" solenoid 308, by moving the switch element of the "forward" switch 250 into engagement with the contact 274 so as to effect energization of the relay coil 280 and closure of the relay switch element 278, will result in the valve 296 shifting to couple the output of the pump 298 to the "forward" motor work port 214 and to couple the "reverse" work port 220 to the return line 302. Energization of the "reverse" solenoid of the control valve 296 is accomplished by first energizing the interlock lead 264 by moving the switch element 260 of the "forward" switch 250 into engagement with the contact 262. The switch element 266 of the "reverse" switch 252 is then manually moved and held against the contact 270 to complete a circuit to the "reverse" solenoid 310. This will result in the valve 296 shifting to connect the output of the pump 298 to the motor "reverse" work port 220 by way of the line 306, and to connect the motor "forward" work port to the sump 230 by way of the return line 302. The motor 66 will operate in "reverse" so long as the switch element 266 is held depressed by the operator. Appropriate controls for the swash plate of the pump 298 would be used to establish the displacement for resulting in the desired "forward" and "reverse" speeds of the motor 66, the maximum "reverse" speed being approximately one-fourth of the maximum "forward" speed.

The pump 298 could be a fixed displacement pump in which case the reverse speed of the motor 66 could be controlled by placing a flow control valve of known construction in the line 306 which operates in response to pressure fluid being routed to the line 306 in the direction of the motor 66 to divert part of this flow to the sump 230.

We claim:

1. In a crop harvesting platform including a plurality of driven crop treating elements including a crop engaging reel, a crop cutting sicklebar arrangement, at least one center-feed auger, and upper and lower conditioning rolls, a reversible drive arrangement, comprising: a constant mesh gear train including an input gear and upper and lower conditioner roll drive gears; a reversible power device coupled to said input drive gears; an auger chain drive coupled for rotating in unison with one of said upper and lower conditioner roll drive gears for directly driving said at least one center-feed auger; a sicklebar knife drive including: a knife drive toothed-belt sprocket mounted for rotating in concert with said at least one center-feed auger, a knife drive belt idler, a knife drive housing including an output shaft coupled to said sicklebar knife, an input shaft having an input toothed-belt sprocket secured thereto, and a toothed belt entrained about said knife drive toothed-belt sprocket, said knife drive belt idler and said input toothed-belt sprocket; and a reel drive including: a first belt sheave mounted for rotation in unison with said one of said upper and lower center-feed augers, a jackshaft, a second belt sheave mounted on said jackshaft, a reel drive belt entrained about said first and second belt sheaves, a belt tensioning means including idler pulley means engaged with said reel drive belt for maintaining tension in said belt for both forward and reverse drive of said reel, a first reel drive chain sprocket mounted on said jackshaft, a reel shaft, a second reel drive chain sprocket mounted on said reel shaft, and a reel drive chain entrained about said first and second reel drive chain sprockets.

2. The crop harvesting platform defined in claim 1 wherein said at least one center-feed auger is an upper auger; a lower center-feed auger; said auger chain drive including a first upper auger drive chain sprocket coupled for rotating in unison with said upper conditioner roll drive gear; a second upper drive chain sprocket coupled for directly driving said upper center-feed auger; a first lower auger drive chain sprocket coupled for rotating in unison with said lower conditioner roll drive gear; a second lower auger drive chain sprocket coupled for directly driving said lower center-feed auger; and upper and lower auger drive chains respectively coupled between said upper drive chain sprockets and between said lower drive chain sprockets.

3. The crop harvesting platform defined in claim 1 wherein said reversible power device is a hydrostatic drive including a pump, a motor coupled for receiving working fluid from said pump and having an output shaft fixed to said input gear; and control means for selectively reversing the flow of working fluid received by said motor from said pump.

4. The crop harvesting platform defined in claim 3 wherein said control means includes a solenoid-operated motor control valve connected between said pump and "forward" and "reverse" ports of said motor; said motor control valve including a spring-centered spool having "forward" and "reverse" solenoids at its opposite ends, with the spool being shifted from a centered "neutral" position, blocking flow to and from said "forward" and "reverse" ports, to a "forward" position, in response to said "forward" solenoid being energized, wherein working fluid is coupled to said "forward" port and said "reverse" port is coupled to sump, and a "reverse" position, in response to said "reverse" port being energized, wherein working fluid is coupled to said "reverse" port and said "forward" port is coupled to sump; and an electrical circuit for controlling energization of said "forward" and "reverse" solenoids including: a source of electrical power, a platform drive "forward" switch having "open" and "forward" contacts and a manually operable switching element movable from a normal position engaging said "open contact and an actuated position engaging said "on" contact, a platform drive "reverse" switch having "open" and "reverse" contacts and having a switching element normally biased to said "open" contact and being manually movable against the bias to, and retainable in, engagement with said "reverse" contact, and said "open" contact of said "forward" switch being connected to said switching element of said "reverse" switch, said "reverse" contact of said "reverse" switch being connected to said "reverse" solenoid of said motor control valve, whereby simultaneous energization of said "forward" and "reverse" solenoids is prevented, and said "forward" contact of said "forward" switch being connected to said "forward" solenoid of said motor control valve for establishing a current path to said "forward" solenoid of said motor control valve responsive to said "forward" switch being closed.

5. The crop harvesting platform defined in claim 4 and further including operator presence interlock circuitry comprising a latching relay having a normally open relay switch provided with switching element coupled to the "forward" contact of said "forward" control switch and provided with a coil connected to said "forward contact and connected to ground by an operator presence sensing circuit for establishing a current path to said coil only when an operator is located in a preselected position for safely operating said platform.

6. In a crop harvesting platform including a plurality of driven crop treating devices including a reel, a cutting device including at least one reciprocable sicklebar knife, upper and lower center-feed augers, and upper and lower conditioning rolls, located serially from front to rear on the platform, a reversible drive arrangement, comprising: a reversible power device; a power distribution gear train including an input shaft coupled to said power device, an upper output shaft being generally axially aligned with and coupled for driving said upper conditioner roll, and a lower output shaft being generally axially aligned with and coupled for driving said lower conditioner roll; said upper and lower center-feed augers respectively including upper and lower auger support shaft means located ahead of said upper and lower output shafts; a first chain drive means being coupled between said upper output shaft and said upper auger support shaft means; a second chain drive means being coupled between said lower output shaft and said lower auger support shaft means; a sicklebar knife drive means coupled to said at least one sicklebar knife and including a knife drive input shaft located forwardly of said upper and lower auger support shaft means; a toothed-belt drive means coupled between one of said upper and lower auger support shaft means and said knife drive input shaft; said reel including a reel support shaft located ahead of said one of said first and second support shafts; and a reel drive means being coupled between said one of said upper and lower auger support shaft means and said reel support shaft, whereby operating said reversible power device in reverse will result in all of the drive crop treating devices being driven in reverse.

7. The crop harvesting platform defined in claim 6 wherein said toothed-belt drive means is coupled between said upper auger support shaft means and said knife drive input shaft.

8. The crop harvesting platform defined in claim 6 wherein said cutting device includes a second sicklebar knife and a second sicklebar knife drive located on an opposite side of the platform from said first-mentioned sicklebar knife drive and including a second knife drive input shaft; and a second toothed belt drive means being coupled between said one of said upper and lower auger shaft means and said second knife drive input shaft.

9. The crop harvesting platform defined in claim 8 wherein said at least one and second toothed belt drive means are respectively coupled between said upper auger support shaft means and the first-mentioned and second knife drive input shafts to time the at least one and second sicklebar knives to balance reciprocating dynamic knife forces.

10. The crop harvesting platform defined in claim 6 wherein said reversible power device is a hydrostatic drive including a pump, a motor coupled for receiving working fluid from said pump and having an output shaft coupled to said input shaft of said power distribution gear train; and control means for selectively reversing the flow of working fluid received by said motor from said pump.

11. In a crop harvesting platform including a plurality of driven crop treating devices including a reel, a cutting device including at least one reciprocable sickle bar, upper and lower center-feed augers, and upper and lower conditioning rolls, located serially from front to rear on the platform, a reversible drive arrangement for simultaneously reversing operation of all of said driven crop treating devices, comprising: a power distribution gear drive including an input shaft; a reversible hydraulic motor having an output shaft coupled to said input shaft and having "forward" and "reverse" work ports respectively for receiving working fluid pressure for driving said motor either forwardly or in reverse; a pump coupled for supplying working fluid pressure to said motor; electro-hydraulic control means including "forward" and "reverse" solenoids respectively energizable for establishing conditions effecting delivery of said working fluid pressure either to the "forward" work port or to the "reverse" work port of said motor; said control means further including a "reverse" switch having a switch element normally engaged with an "open" contact and selectively movable to engage a "reverse" contact connected to said "reverse" solenoid; a "forward" switch having a switch element selectively movable between "interlock" and "forward" contacts; an "interlock" lead connected between said "interlock" contact and said switch element of said "reverse" switch; a source of electrical power being connected to said switch element of said "forward" switch; a "forward" drive relay switch including a switch element normally engaged with an "off" contact and a relay coil connected in series with said "forward" contact of said "forward" switch for moving said relay switch element into engagement with a "forward" contact which is coupled to said "forward" solenoid, whereby driving of said platform driven crop treating devices in a forward direction is initiated by movement of said "forward" switch element into engagement with said "forward" contact; and driving of said platform driven crop treating devices in a rearward direction is initiated by first placing said switch element of said "forward" switch into engagement with said "interlock" contact and then moving and holding said switch element of said "reverse" switch into engagement with said "reverse" contact.

12. The crop harvesting platform defined in claim 11 wherein said pump is a variable displacement, reversible pump including a swashplate and "forward" and "reverse" swashplate control cylinders respectively pressurable for moving said swashplate to opposite sides of a "neutral" position; said pump being connected in a closed loop with said motor whereby selective pressurization of said "forward" and "reverse" control cylinders will respectively cause said motor to be driven in forward and reverse directions; a control fluid pressure source; a sump; "forward" and "reverse" control valves respectively being connected to said "forward" and "reverse" control cylinders and each being connected to said pressure source and said sump; said "forward" and "reverse" solenoids respectively forming part of said "forward" and "reverse" control valves and when respectively energized effecting movement of said "forward" and "reverse" valves for coupling pressurized fluid to said "forward" and "reverse" cylinders.

13. The crop harvesting platform defined in claim 11 wherein said control means includes a direction control valve coupled between said pump and motor and shiftable to opposite sides of a centered "neutral" position to "forward" and "reverse" positions respectively for causing said motor to be driven forwardly and in reverse; and said direction control valve including said "forward" and "reverse" solenoids, which when selectively energized respectively cause said direction control valve to shift from its "neutral" position to said "forward" and "reverse" positions.

14. The crop harvesting platform defined in claim 11 wherein said control means includes operator position sensing means coupled to said forward drive relay switch and being responsive to an operator being improperly positioned for safe operation for de-energizing said relay coil so as to effect an open circuit to said "forward" solenoid to thereby neutralize operation of said pump.

* * * * *